US009747134B2

(12) United States Patent
Magro et al.

(10) Patent No.: US 9,747,134 B2
(45) Date of Patent: Aug. 29, 2017

(54) RDMA (REMOTE DIRECT MEMORY ACCESS) DATA TRANSFER IN A VIRTUAL ENVIRONMENT

(71) Applicant: Intel Corporation, Santa Clara, CA (US)

(72) Inventors: William R. Magro, Champaign, IL (US); Robert J. Woodruff, Banks, OR (US); Jianxin Xiong, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/810,170

(22) Filed: Jul. 27, 2015

(65) Prior Publication Data
US 2015/0331722 A1    Nov. 19, 2015

Related U.S. Application Data

(63) Continuation of application No. 14/193,799, filed on Feb. 28, 2014, now Pat. No. 9,411,651, which is a continuation of application No. 13/523,505, filed on Jun. 14, 2012, now Pat. No. 8,707,331, which is a continuation of application No. 13/159,238, filed on Jun. 13, 2011, now Pat. No. 8,225,330, which is a continuation of application No. 11/639,131, filed on Dec. 14, 2006, now Pat. No. 7,987,469.

(51) Int. Cl.
| | |
|---|---|
| *G06F 9/50* | (2006.01) |
| *G06F 9/455* | (2006.01) |
| *G06F 15/173* | (2006.01) |
| *G06F 9/54* | (2006.01) |

(52) U.S. Cl.
CPC ........ *G06F 9/5016* (2013.01); *G06F 9/45533* (2013.01); *G06F 9/45558* (2013.01); *G06F 9/546* (2013.01); *G06F 15/17331* (2013.01); *G06F 2009/4557* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 6,075,938 A  * | 6/2000 | Bugnion | .................. 395/500.48 |
| 7,424,710 B1 | 9/2008 | Nelson et al. | |
| 7,716,680 B2 | 5/2010 | Stall | |
| 7,987,469 B2 | 7/2011 | Magro et al. | |
| 8,200,796 B1* | 6/2012 | Margulis | ....................... 709/223 |
| 8,225,330 B2 | 7/2012 | Magro et al. | |

(Continued)

OTHER PUBLICATIONS

USPTO Notice of Allowance in U.S. Appl. No. 14/193,799 mailed on Apr. 18, 2016, 11 pages.

(Continued)

*Primary Examiner* — Tuan Dao
(74) *Attorney, Agent, or Firm* — Patent Capital Group

(57) ABSTRACT

In an embodiment, a method is provided. In an embodiment, the method provides determining that a message has been placed in a send buffer; and transferring the message to an application on a second virtual machine by bypassing use of an operating system to process the message by directly placing the message in an application memory space from which the application can retrieve the message.

27 Claims, 6 Drawing Sheets

(56) References Cited

U.S. PATENT DOCUMENTS

| | | | |
|---|---|---|---|
| 8,707,331 | B2 | 4/2014 | Magro et al. |
| 2002/0129085 | A1 | 9/2002 | Kubala et al. |
| 2004/0205253 | A1 | 10/2004 | Arndt et al. |
| 2005/0102671 | A1 | 5/2005 | Baumberger |
| 2005/0135173 | A1 | 6/2005 | Fan |
| 2006/0075067 | A1 | 4/2006 | Blackmore et al. |
| 2006/0235999 | A1 | 10/2006 | Shah et al. |
| 2006/0253619 | A1 | 11/2006 | Torudbakken et al. |
| 2006/0259731 | A1 | 11/2006 | Oshins et al. |
| 2007/0143315 | A1 | 6/2007 | Stone |
| 2007/0208820 | A1 | 9/2007 | Makhervaks et al. |
| 2007/0271559 | A1 | 11/2007 | Easton et al. |
| 2009/0083500 | A1 | 3/2009 | Burchard et al. |
| 2009/0178039 | A1 | 7/2009 | Tene et al. |
| 2015/0331722 | A1 | 11/2015 | Magro et al. |

OTHER PUBLICATIONS

USPTO Non Final Office Action in U.S. Appl. No. 14/193,799 mailed on Jan. 30, 2015.

USPTO Final Office Action in U.S. Appl. No. 14/193,799 mailed on May 14, 2015.

USPTO Non Final Office Action in U.S. Appl. No. 14/193,799 mailed on Aug. 6, 2015.

Liu, et al. "High Performance VMM-Bypass I/O in Virtual Machines", 2006, pp. 1-14.

Compaq Computer Corp/Intel Corporation/Microsoft Corporation, "Virtual Interface Architecture Specification", Version 1.0, Dec. 16, 1997, 83 pages.

InfiniBand Trade Association, "InifiniBand Architecture Specification", vol. 2, Release 1.2.1, Final Release, Oct. 2006, 833 Pages.

D. Abramson et al., "Intel Virtualization Technology for Directed I/O", Intel Corporation, Intel Technology Journal, vol. 10, Issue 03, Aug. 10, 2006, pp. 179-192.

USPTO Non Final Office Action in U.S. Appl. No. 11/639,131 mailed on Apr. 4, 2010, 18 pages.

USPTO Final Office Action in U.S. Appl. No. 11/639,131 mailed on Oct. 6, 2010, 18 pages.

USPTO Notice of Allowance in U.S. Appl. No. 11/639,131 mailed on Mar. 17, 2011, 8 pages.

USPTO Non Final Office Action in U.S. Appl. No. 13/159,238 mailed on Nov. 29, 2011, 29 pages.

USPTO Notice of Allowance in U.S. Appl. No. 13/159,238 mailed on Mar. 30, 2012, 16 pages.

USPTO Non Final Office Action in U.S. Appl. No. 13/523,505 mailed on Jun. 28, 2013, 23 pages.

USPTO Final Office Action in U.S. Appl. No. 13/523,505 mailed on Oct. 9, 2013, 23 pages.

USPTO Notice of Allowance in U.S. Appl. No. 13/523,505 mailed on Dec. 3, 2013, 11 pages.

USPTO Final Office Action in U.S. Appl. No. 14/193,799 mailed on Jan. 5, 2016, 19 pages.

\* cited by examiner

RDMA (REMOTE DIRECT MEMORY ACCESS) DATA TRANSFER IN A VIRTUAL ENVIRONMENT

CROSS-REFERENCE TO RELATED APPLICATIONS

This Application is a continuation (and claims the benefit of priority under 35 U.S.C. §120) of U.S. application Ser. No. 14/193,799, filed Feb. 28, 2014, now issued as U.S. Pat. No. 9,411,651 and entitled RDMA (REMOTE DIRECT MEMORY ACCESS) DATA TRANSFER IN A VIRTUAL ENVIRONMENT, which application is a continuation of U.S. patent application Ser. No. 13/523,505, filed Jun. 14, 2012, now issued as U.S. Pat. No. 8,707,331, which application is a continuation of U.S. patent application Ser. No. 13/159,238, filed Jun. 13, 2011, now issued as U.S. Pat. No. 8,225,330, which application is a continuation of U.S. patent application Ser. No. 11/639,131, filed Dec. 14, 2006, now issued as U.S. Pat. No. 7,987,469. The disclosures of the prior Applications are considered part of and are incorporated by reference in the disclosure of this Application.

FIELD

Embodiments of this invention relate to RDMA (remote direct memory access) data transfer in a virtual environment.

BACKGROUND

Traditional RDMA allows data to move directly from the memory of one computer into that of another without involving either one's CPU (central processing unit), and specifically, either one's operating system. This permits high-throughput, low-latency networking by eliminating the need to copy data between application memory and the data buffers in the operating system.

A virtual computing environment refers to a computer system in which a single physical machine may be observed as multiple virtual machines, and where a set of physical hardware resources can be used as multiple virtual resources. Each virtual machine can run its own operating system that may control the set of virtual hardware resources.

Typically, data transfer between two virtual machines passes through a virtual network device. However, virtualization of certain devices may introduce considerable overhead.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples are described in detail, or where one or more examples are provided, it should be understood that the examples are not to be construed as exhaustive, and are not to be limited to embodiments of the invention to the examples described and/or illustrated.

Figure 1:
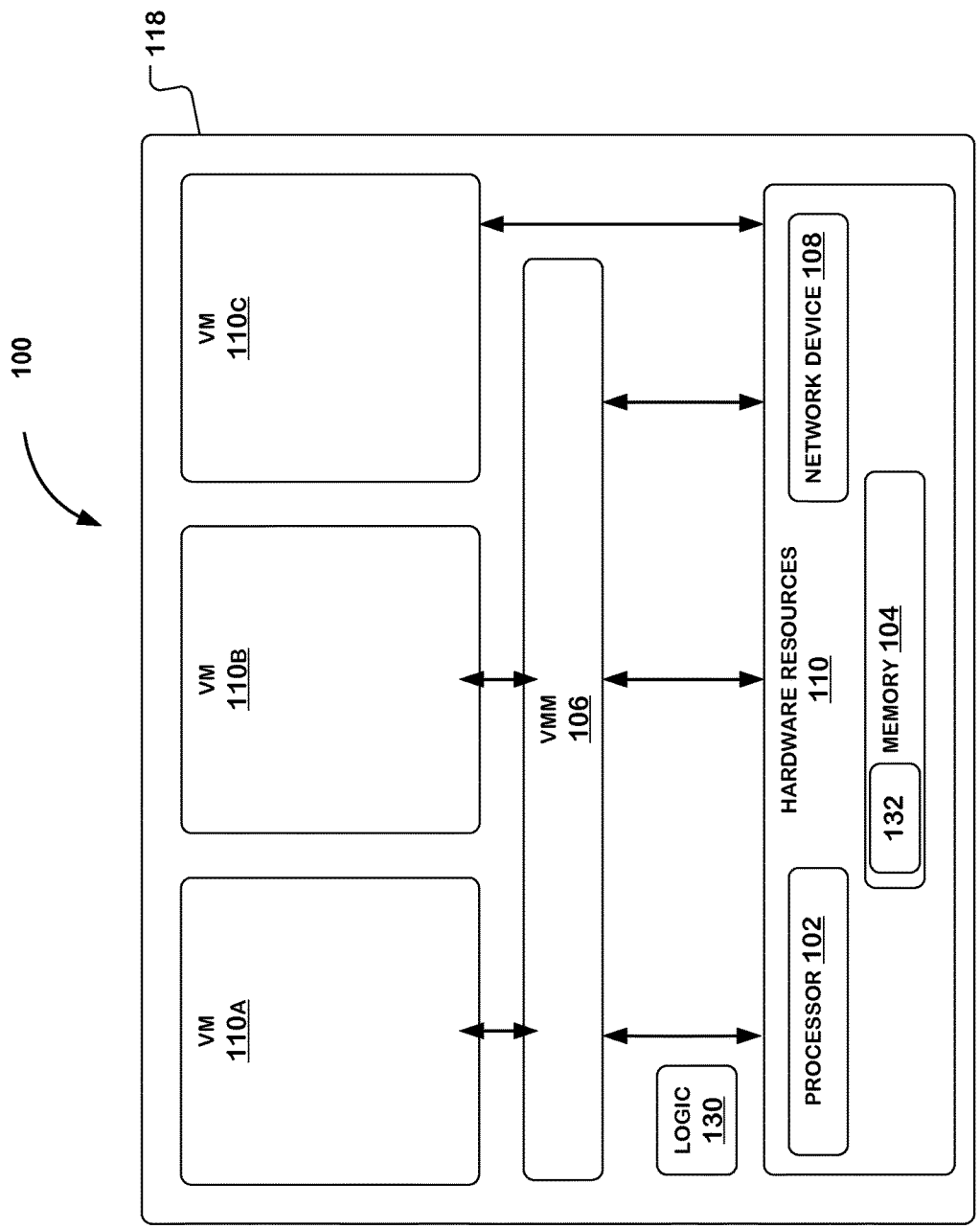
FIG. 1 is a block diagram that illustrates a computing system supporting a virtual environment according to an embodiment.

FIG. 1 illustrates a computer system 100 that supports a virtual environment. System 100 may comprise virtual machines 110A, 110B, 110C, virtual machine monitor 106, hardware resources 110, and logic 130. Logic 130 may comprise hardware, software, or a combination of hardware and software (e.g., firmware). For example, logic 130 may comprise circuitry (i.e., one or more circuits), to perform operations described herein. For example, logic 130 may comprise one or more digital circuits, one or more analog circuits, one or more state machines, programmable logic, and/or one or more ASIC's (Application-Specific Integrated Circuits). Logic 130 may be hardwired to perform the one or more operations. Alternatively or additionally, logic 130 may be embodied in firmware, in machine-executable instructions 132 stored in a memory, such as memory 104, to perform these operations, or in various other components of system 100. Logic 130 may be used to perform various functions by various components as described herein.

Hardware resources 110 refer to physical hardware components associated with system 118 including, but not limited to, a processor 102, such as CPU (central processing unit), memory 104, and network device 108. Processor 102, host memory 104, and network device 108 may be comprised in a single circuit board, such as, for example, a system motherboard 118. Alternatively, network device 108 may be comprised in a circuit card that may be inserted into a circuit card slot.

Processor 102 may comprise processing circuitry to carry out computational tasks of system 100. For example, processor 102 may include a CPU such as, for example, the Intel® Pentium® family of processors, or Intel® Xeon™ processor, both commercially available from Intel® Corporation. Of course, alternatively, processor 102 may comprise another type of processor, such as, for example, a microprocessor that is manufactured and/or commercially available from Intel® Corporation, or a source other than Intel® Corporation, without departing from embodiments of the invention.

Network device 108 as referred to herein relates to a device which may be coupled to a data transmission medium to transmit data to or receive data from other devices coupled to the data transmission medium. For example, network device 108 may be designed to transmit data to or receive data from devices coupled to a network such as a local area network. Such a network device may communicate with other devices according to any one of several data communication formats such as, for example, communication formats according to versions of IEEE Std. 802.3 (Ethernet), IEEE Std. 802.11, IEEE Std. 802.16, Universal Serial Bus, Firewire, asynchronous transfer mode (ATM), synchronous optical network (SONET) or synchronous digital hierarchy (SDH) standards.

Memory 104 may store machine-executable instructions 132 that are capable of being executed, and/or data capable of being accessed, operated upon, and/or manipulated by logic, such as logic 130, and/or processor, such as processor 102. The execution of program instructions 132 and/or the accessing, operation upon, and/or manipulation of this data by logic 130 for example, may result in, for example, system 100 and/or logic 130 carrying out some or all of the operations described herein. Memory 104 may, for example, comprise read only, mass storage, random access computer-accessible memory, and/or one or more other types of machine-accessible memories. This may include, for example, DRAM (dynamic random access memory) or SRAM (static random access memory), but embodiments of the invention are not so limited.

System 100 may comprise a plurality of virtual machines 110A, 110B, 110C. While only three are shown, system 100 may comprise more or less virtual machines than those illustrated. One or more virtual machines 110A, 110B, 110C may each include hardware resources 110. Hardware resources 110 may be virtualized, meaning that a single physical hardware resource 110 may be partitioned into multiple virtual hardware resources to enable system 100 to use the single physical hardware resource 110 in multiple virtual machines 110A, 110B, 110C. Virtualization may be implemented using VMM 106. In an embodiment, VMM 106 comprises software that imposes a virtualization layer in system 100 in which hardware resources 110 may be virtualized into virtual machines 110A, 110B, 110C.

Figure 2:
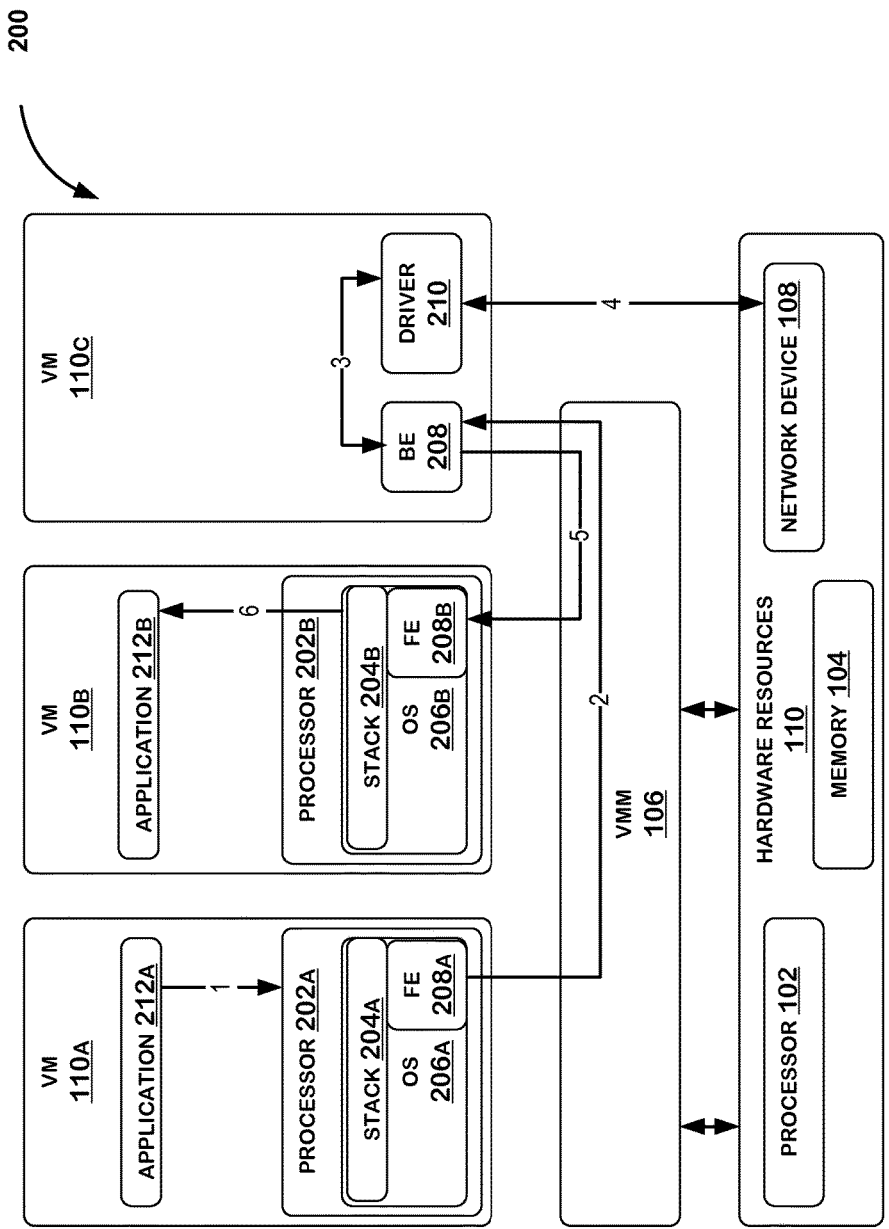
FIG. 2 is a block diagram that illustrates a data transfer operation in a virtual environment as embodied in prior art.

FIG. 2 illustrates a conventional virtual environment system 200. In this conventional system 200, data is typically transferred between, for example, virtual machine 110A and virtual machine 110B, by using a virtual network device, such as virtual machine 110C. Virtual machines 110A, 110B may each comprise application 212A, 212B, and virtual processor 202A, 202B. Processors 202A, 202B may each execute operating system 206A, 206B, where a network protocol stack 204A, 204B may be executed. Operating system 206A, 206B may also include a front end driver 208A, 208B to assist in the transfer of data. Virtual machine 110C may be used as a virtual network device to further assist in the transfer of data. Virtual machine 110C may include a back end driver 208 that interfaces with device driver 210, which in turn communicates with network device 108.

In conventional system 200, application 212A on virtual machine 110A may initiate data transfer by generating a message, and passing the message to network protocol stack 204A executed by operating system 206A of processor 202A (1). Once the message is passed through network stack 204A, front end driver 208A may transmit the message to back end driver 208 on virtual machine 110C (2). Back end driver 208 may communicate the message to actual network device driver 210 (3). Network device driver 210 may then communicate the message to network device 108 (4), where network device 108 may determine destination address of message. Upon determining that the message is to be forwarded to virtual machine 110B, network device 108 may pass the message back to device driver 210 (4), where device driver 210 may transmit to back end driver 208 (3). Back end driver 208 may then transmit the message to front end driver 208B on virtual machine 110B (destination) (5), where the message is passed up through stack 202B, and finally to application 212B.

Figure 3:
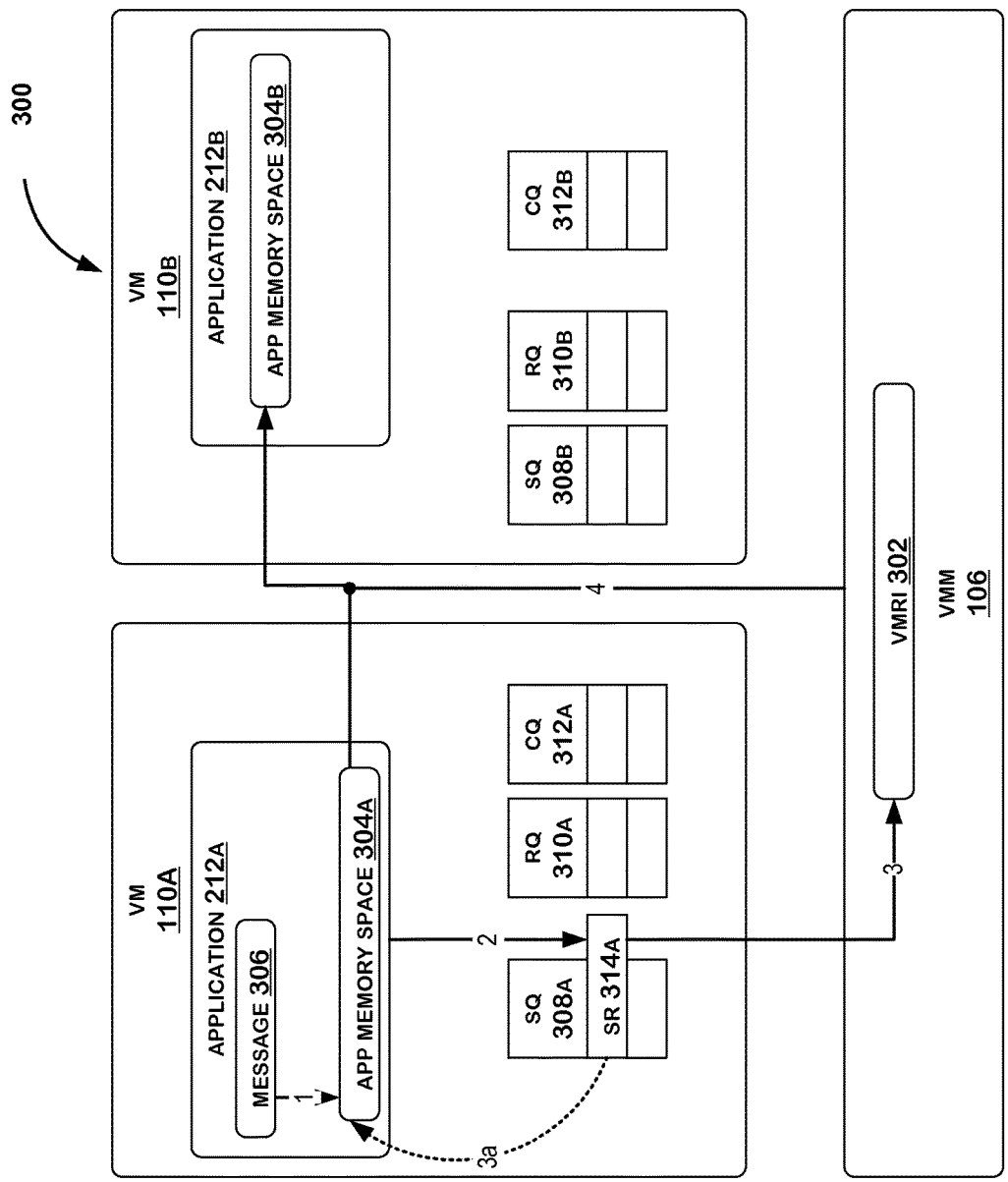
FIG. 3 is a block diagram that illustrates a data transfer operation according to embodiments of the invention.
Figure 4:
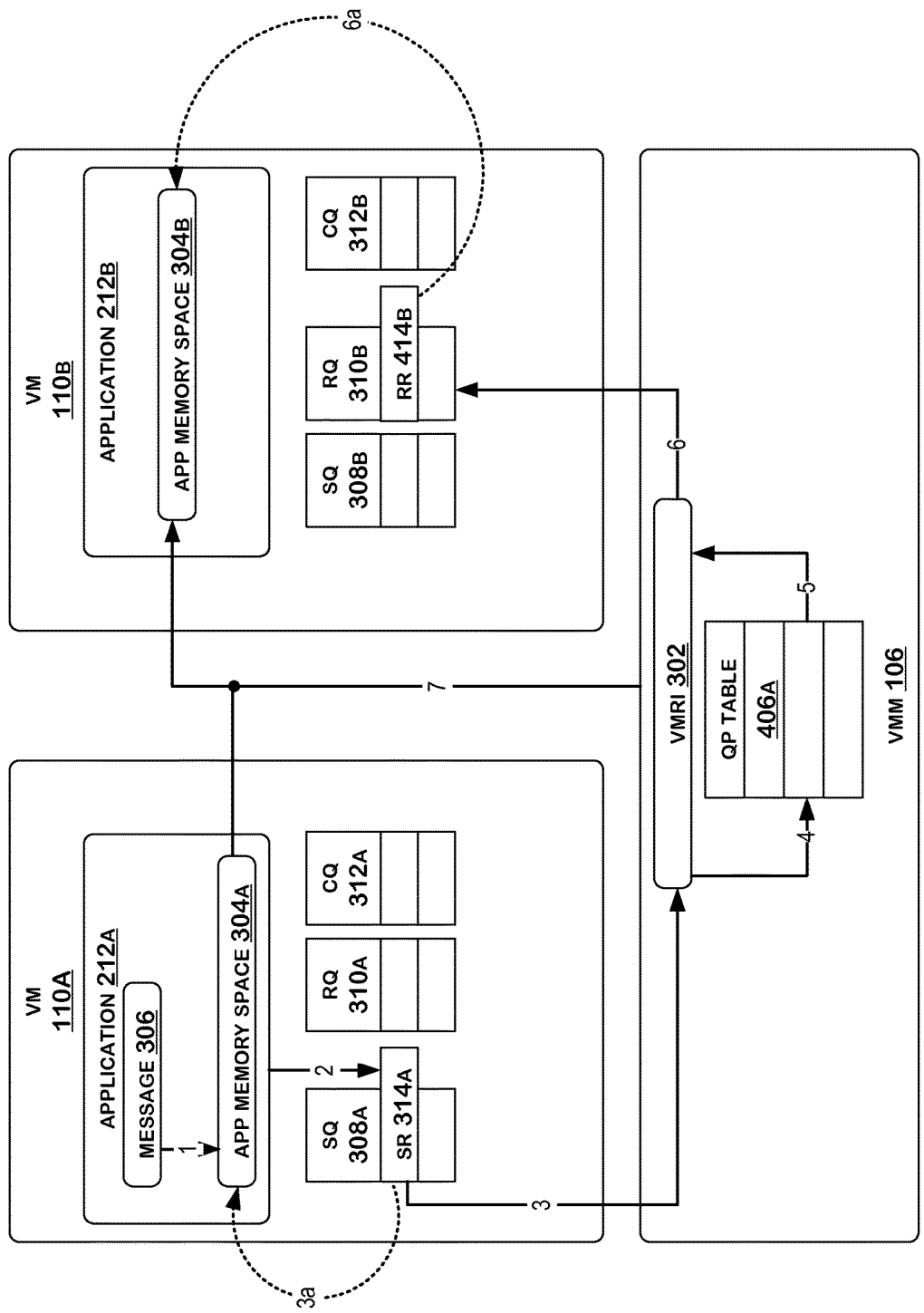
FIG. 4 is a block diagram that illustrates a data transfer operation according to an embodiment of the invention.
Figure 5:
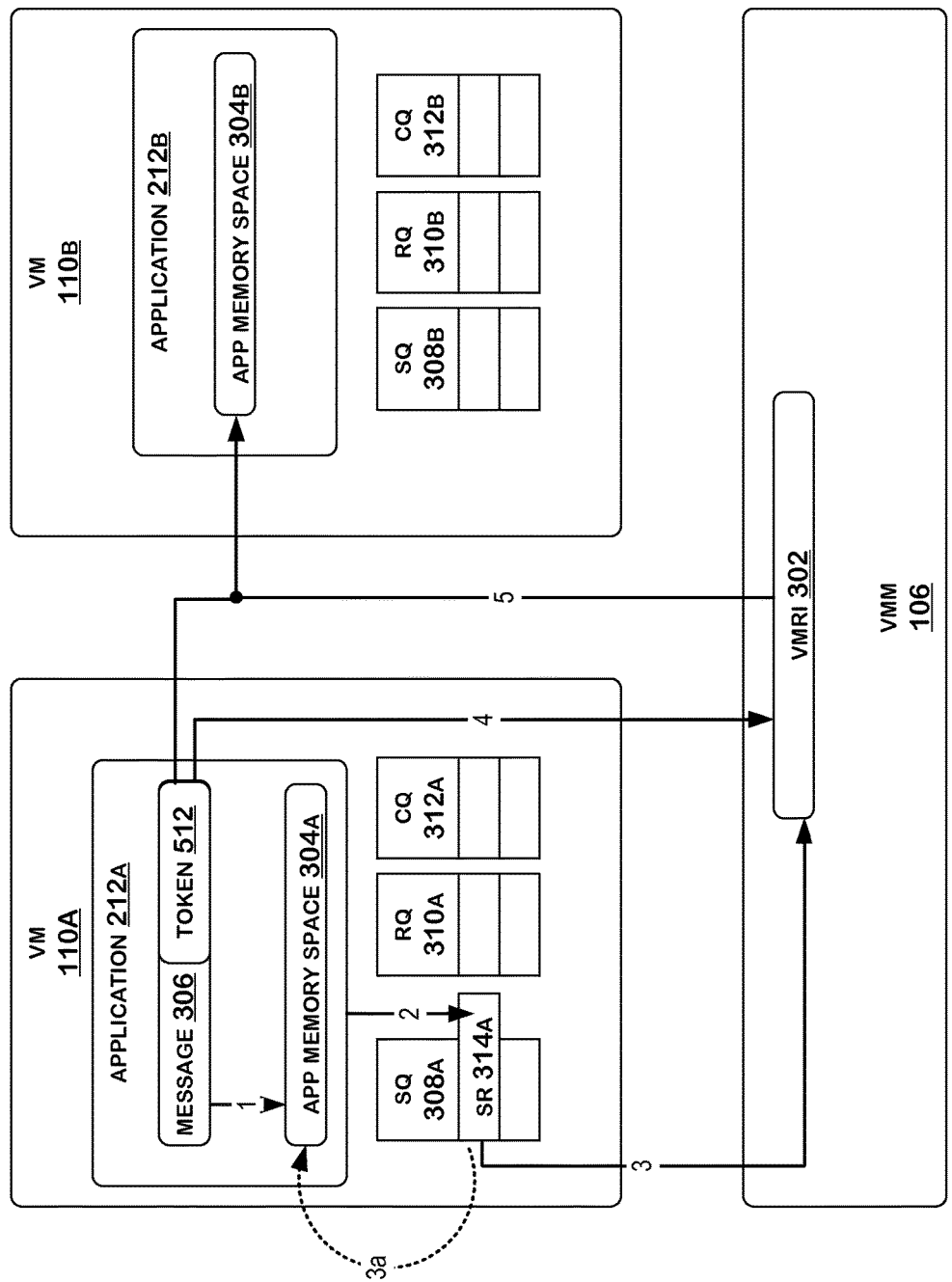
FIG. 5 is a block diagram that illustrates a data transfer operation according to another embodiment of the invention.

FIG. 3 illustrates a system in accordance with embodiments of the invention. FIG. 4 illustrates the system according to one embodiment, and FIG. 5 illustrates the system according to another embodiment.

Figure 6:
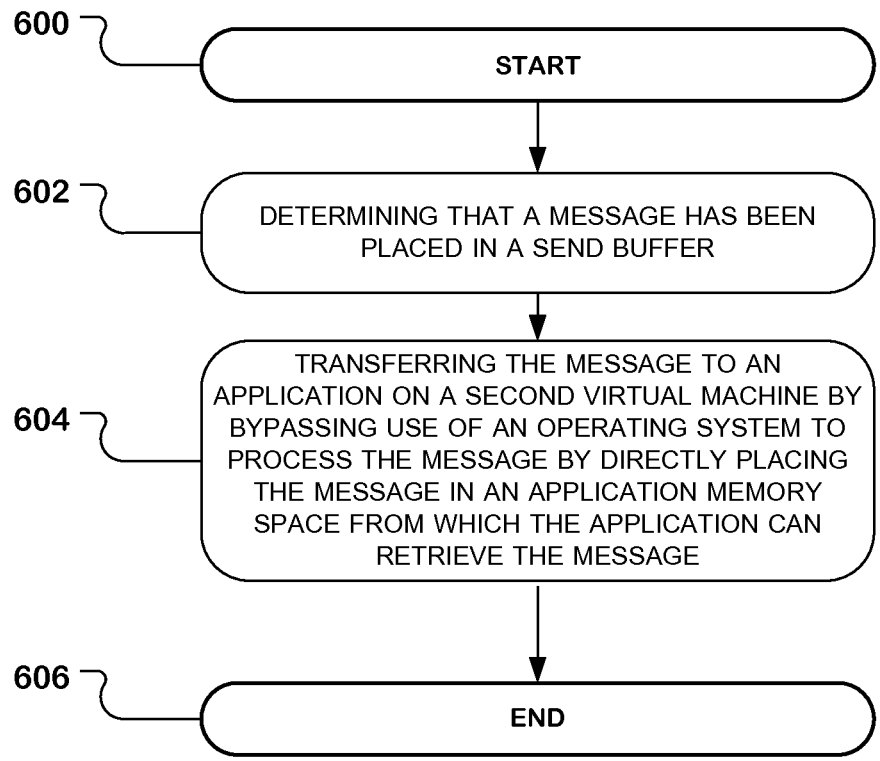
FIG. 6 is a flowchart illustrating a method according to an embodiment.

FIG. 6 is a flowchart illustrating a method according to an embodiment. The method begins at block 600 and continues to block 602 where the method may comprise determining that a message has been placed in a send buffer.

Referring back to FIG. 3, source application 212A may generate a message 306, and may store message 306 (1) in a send buffer of an application memory space 304A. A message may comprise data and control information to indicate, for example, what to do with the data. Application memory space 304A may be comprised in, for example, an SRAM memory, or a DRAM memory, such as memory 104. Application 212A may generate send request 314A, and post send request 314A to send queue 308A (2). Send request 314A may include information about message 306, such as an address at which message 306 is stored, and may also include information about the send request 314A itself, such as the request type (i.e., SEND), and the length of the request.

In an embodiment, VMRI (virtual machine RDMA interface) 302 may detect that a send request 314A has been posted to send queue 308A, indicating to VMRI 302 that a message 306 has been placed in a send buffer of application memory space 304A. VMRI 302 refers to an interface that may be called by operating systems 206A, 206B of virtual machines 110A, 110B. VMRI 302 may be implemented in any combination of software and hardware. In an embodiment, VMRI 302 is presented as a service of VMM 106. VMRI 302 may be based, at least in part, on RDMA semantics as defined by any of several RDMA-based protocols. An RDMA-based protocol may comprise, for example, Virtual Interface Architecture (VIA), Version 1.0, Dec. 16, 1997; Infiniband™ Architecture (IBA), Volume 2, Release 1.2.1., October 2006; or Remote Direct Data Placement (RDDP), RFC 4296, December 2005. Other volumes and/or specifications of these specifications, as well as other protocols, may be used without departing from embodiments of the invention.

When source application 212A wishes to send data to destination application 212B, source application 212A may perform one or more operations that result in operating system 206A calling VMRI 302. When VMRI is called, it may set-up queue pairs between the source application 212A and the destination application 212B, including send queues 308A, 308B, receive queues 310A, 310B, and completion queues 312A, 312B. The queue pairs are set-up such that each send queue 308A, 308B has a corresponding receive queue 310A, 310B, and a corresponding completion queue 312A, 312B. For example, send queue 308A may correspond with receive queue 310B (and send queue 308B may correspond to receive queue 310A). These are described in more detail below.

At block 604, the method may comprise transferring the message to an application on a second virtual machine by bypassing use of an operating system to process the message by directly placing the message in an application memory space from which the application can retrieve the message.

Referring to FIG. 3, message 306 may be transferred from virtual machine 110A to virtual machine 110B by bypassing use of either operating system 206A, 206B (not shown in FIG. 3 since they are not used) by directly placing message 306 in application memory space 304B from which application 212B may retrieve message 306. Processing of message by operating system may include, but is not limited to, for example, passing message through a network protocol stack, and copying message to one or more intermediate (not source or destination) buffers. VMRI 302 may read send request 314A from send queue 308A (3), and retrieve message 306 from send buffer in application memory space 304A as indicated by send request 314A (3a—send request 314A references send buffer in application memory space 304A). VMRI 302 may then directly transfer message 306 to application memory space 304B of destination application 212B (4).

In an embodiment, as illustrated in FIG. 4, directly placing message 306 in an application memory space may comprise VMRI 302 determining a corresponding receive queue 310B from which a receive buffer in application memory space 304B may be determined, and copying message 306 from the send buffer to the receive buffer. VMRI 302 may do this by reading send buffer address from send request 314A (3, 4), and using a queue pair table 406A to match send queue 308A to receive queue 310B. Queue pair table 406A may be initiated when VMRI 302 is called by, for example, operating system 206A. Corresponding receive queue 310B may be returned to VMRI 302 (5). VMRI 302 may then access receive queue 310B (6). Receive queue 310B may include receive request 414B, which includes a reference to receive buffer address (6a). Receive request 414B may be placed in receive queue 310B by application 212B when, for example, it expects other messages to arrive from other computer systems on the network. After determining receive buffer address, VMRI 302 may directly transfer message 306 to application memory space 304B (7) by transferring message 306 from send buffer in application memory space 304A to receive buffer in application memory space 304B. In an embodiment, VMRI 302 may update receive request 414B with the status of the transfer, and application 212B may check the status of receive request 414B to determine if data has arrived.

In another embodiment, as illustrated in FIG. 5, directly placing message 306 in an application memory space may comprise VMRI 302 generating from token 512 a receive buffer address in application memory space 304B, and copying message 306 from the send buffer in application memory space 304A to the receive buffer in application memory space 304B. In this embodiment, message 306 may include a token 512. Token 512 may uniquely identify a registered memory region on a specific computer, and may further be unique for all nodes on the network. Token 512 may be generated when application 212B registers a memory region on virtual machine 1106 to allow memory operations (such as RDMA) to/from that memory region. Token 512 may then be passed to application 212A. In this embodiment, VMRI 302 may obtain message 306 with token 512 from application memory space 304A at send buffer address, extract token 512, and may generate from the token a receive buffer address in application memory space 304B (4). Message 306 may then be copied from send buffer in application memory space 304A to receive buffer in application memory space 304B (5).

In an embodiment, completion queues 312A may be updated. In an embodiment, completion queue 312A may be updated when message 306 is actually transferred to application memory space 304B of destination application 212B. In another embodiment, completion queue 312A may be updated when message 306 is transferred from application memory space 304A of source application 212A.

The method may end at block 606.

CONCLUSION

Therefore, in an embodiment, a method may comprise determining that a message has been placed in a send buffer; and transferring the message to an application on a second virtual machine by bypassing use of an operating system to process the message by directly placing the message in an application memory space from which the application can retrieve the message.

Embodiments of the invention utilize an RDMA-based protocol to transfer data without involving the operating system or host processor. Such direct copying of data from one application memory space to another application memory space eliminates the need for intermediate buffering, which may both introduce latency and limit bandwidth.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. At least one non-transitory machine readable storage medium having instructions stored thereon, the instructions when executed by a machine to cause the machine to:
provide a virtual machine monitor to facilitate the transfer of data among a first virtual machine, a second virtual machine, and one or more devices coupled to the machine via a network, the first virtual machine and the second virtual machine to utilize virtualized hardware resources of the machine, the first virtual machine to execute a first operating system, the second virtual machine to execute a second operating system;
allocate a receive buffer in a memory space of the first virtual machine;
receive, at the virtual machine monitor, an address of the receive buffer allocated in the memory space of the first virtual machine;
receive a first message destined for the first virtual machine, wherein the message destined for the first virtual machine is received after the address of the receive buffer is received by the virtual machine monitor; and
place the first message destined for the first virtual machine into the receive buffer in the memory space of the first virtual machine, wherein placing the first message into the receive buffer of the memory space of the first virtual machine comprises bypassing use of the first operating system.

2. The at least one medium of claim 1, wherein placing the first message into the receive buffer in the memory space of the first virtual machine comprises bypassing a network protocol stack of the first virtual machine.

3. The at least one medium of claim 1, wherein the instructions when executed by the machine are further to facilitate delivery of a second message sent by the first virtual machine, wherein the second message bypasses the first operating system.

4. The at least one medium of claim 1, wherein the memory space of the first virtual machine comprises an application memory space accessible by an application run by the first operating system.

5. The at least one medium of claim 1, wherein the virtualized hardware resources comprise virtualized memory comprising the memory space of the first virtual machine.

6. The at least one medium of claim 1, wherein the virtualized hardware resources comprise a virtualized network device to communicate with the one or more devices coupled to the machine via the network.

7. The at least one medium of claim 1, wherein the first message is transferred from an application memory space of the second virtual machine.

8. The at least one medium of claim 7, wherein the first message is not placed in a network protocol stack of the second virtual machine.

9. The at least one medium of claim 1, wherein the instructions when executed by the machine are further to cause the machine to establish a queue associated with the first virtual machine, the queue including the address of the receive buffer.

10. The at least one medium of claim 1, wherein the instructions when executed by the machine are further to initiate a queue pair comprising a queue associated with the first virtual machine and a corresponding queue associated with the second virtual machine.

11. The at least one medium of claim 1, wherein the first message for the first virtual machine is generated by the second virtual machine.

12. The at least one medium of claim 1, wherein bypassing use of the first operating system comprises foregoing use of the first operating system to place the first message into an intermediate buffer.

13. The at least one medium of claim 1, wherein a version of the first operating system is distinct from a version of the second operating system.

14. A system comprising:
at least one virtualized hardware resource;
a first virtual machine to execute a first operating system and to utilize the at least one virtualized hardware resource, wherein a receive buffer is allocated in a memory space of the first virtual machine;
a second virtual machine to execute a second operating system and to utilize the at least one virtualized hardware resource; and
at least one processor to execute a virtual machine monitor, the virtual machine monitor to facilitate the transfer of data among the first virtual machine, the second virtual machine, and one or more devices coupled to the system via a network, the virtual machine monitor further to receive an address of the receive buffer allocated in the memory space of the first virtual machine; and
wherein the system is to:
receive a first message destined for the first virtual machine, wherein the first message destined for the first virtual machine is received after the address of the receive buffer is received by the virtual machine monitor; and
place the first message destined for the first virtual machine into the receive buffer in the memory space of the first virtual machine, wherein placing the first message into the receive buffer of the memory space of the first virtual machine comprises bypassing use of the first operating system.

15. The system of claim 14, wherein the virtual machine monitor is further to facilitate delivery of a second message sent by the first virtual machine, wherein the second message bypasses the first operating system.

16. The system of claim 14, wherein the memory space of the first virtual machine comprises an application memory space accessible by an application run by the first operating system.

17. The system of claim 14, wherein the at least one virtualized hardware resource comprises virtualized memory comprising the memory space of the first virtual machine.

18. The system of claim 14, wherein the at least one virtualized hardware resource comprise a virtualized network device to communicate with the one or more devices coupled to the machine via the network.

19. The system of claim 14, wherein the first message is transferred from an application memory space of the second virtual machine.

20. The system of claim 14, wherein bypassing use of the first operating system comprises foregoing use of the first operating system to place the first message into an intermediate buffer.

21. A method comprising:
providing a virtual machine monitor to facilitate the transfer of data among a first virtual machine, a second virtual machine, and one or more devices coupled to the machine via a network, the first virtual machine and the second virtual machine to utilize virtualized hardware resources of the machine, the first virtual machine to execute a first operating system, the second virtual machine to execute a second operating system;
allocating a receive buffer in a memory space of the first virtual machine;
receiving, at the virtual machine monitor, an address of the receive buffer allocated in the memory space of the first virtual machine;
receiving a first message destined for the first virtual machine, wherein the message destined for the first virtual machine is received after the address of the receive buffer is received by the virtual machine monitor; and
placing the first message destined for the first virtual machine into the receive buffer in the memory space of the first virtual machine, wherein placing the first message into the receive buffer of the memory space of the first virtual machine comprises bypassing use of the first operating system.

22. The method of claim 21, wherein the virtual machine monitor is further to facilitate delivery of a second message sent by the first virtual machine, wherein the second message bypasses the first operating system.

23. The method of claim 21, wherein the memory space of the first virtual machine comprises an application memory space accessible by an application run by the first operating system.

24. The method of claim 21, wherein the virtualized hardware resources comprise virtualized memory comprising the memory space of the first virtual machine.

25. The method of claim 21, wherein the virtualized hardware resources comprise a virtualized network device to communicate with the one or more devices coupled to the machine via the network.

26. The method of claim 21, wherein the first message is transferred from an application memory space of the second virtual machine.

27. The method of claim 21, wherein bypassing use of the first operating system comprises foregoing use of the first operating system to place the first message into an intermediate buffer.

* * * * *